(12) United States Patent
Milligan

(10) Patent No.: US 6,854,816 B2
(45) Date of Patent: Feb. 15, 2005

(54) THREE MEMBER THIN DRAWER SLIDE

(75) Inventor: Charles A. Milligan, Hacienda Heights, CA (US)

(73) Assignee: Accuride International Inc., Santa Fe Springs, CA (US)

( * ) Notice: Subject to any disclaimer, the term of this patent is extended or adjusted under 35 U.S.C. 154(b) by 0 days.

(21) Appl. No.: 10/272,617

(22) Filed: Oct. 15, 2002

(65) Prior Publication Data

US 2003/0071548 A1 Apr. 17, 2003

Related U.S. Application Data

(60) Provisional application No. 60/329,057, filed on Oct. 12, 2001.

(51) Int. Cl.$^7$ .............................................. A47B 88/04
(52) U.S. Cl. ................................ 312/334.11; 312/334.8
(58) Field of Search ......................... 312/330.1, 334.1, 312/334.7, 334.8, 334.11, 334.16, 334.17, 350, 351; 211/26; 384/18, 20; 411/1, 2, 3, 4, 5, 351, 388

(56) References Cited

U.S. PATENT DOCUMENTS

| | | | |
|---|---|---|---|
| 2,370,861 A | | 6/1945 | Jakeway |
| 2,649,346 A | | 8/1953 | Woina et al. |
| 2,671,699 A | | 3/1954 | Vignos |
| 3,092,429 A | * | 6/1963 | Barnes ................ 312/334.8 X |
| 3,133,768 A | * | 5/1964 | Klakovich ........... 312/334.8 X |
| 3,258,299 A | | 6/1966 | Meyer |

(List continued on next page.)

FOREIGN PATENT DOCUMENTS

| | | | | |
|---|---|---|---|---|
| CH | 334982 | | 2/1959 | |
| DE | 24 48 335 | | 4/1976 | |
| DE | 26 07 171 | | 9/1977 | |
| DE | 38 36 273 A1 | | 4/1990 | |
| EP | 0 406 647 A2 | | 1/1991 | |
| EP | 583978 | * | 2/1994 | ............ 312/334.11 |
| GB | 620460 | | 3/1949 | |
| GB | 783826 | | 10/1957 | |
| GB | 2 028 109 A | | 3/1980 | |
| GB | 2 061 705 | | 5/1981 | |
| RO | 135308 | | 6/1990 | |

OTHER PUBLICATIONS

PCT International Search Report dated Apr. 29, 2002 from PCT application No. PCT/US01/43759 filed Nov. 16, 2001(3 pages).

PCT International Search Report dated Mar. 5, 2003 from PCT application No. PCT/US02/33405 filed Oct. 15, 2002(5 pages).

Primary Examiner—James O. Hansen
(74) Attorney, Agent, or Firm—Christie, Parker & Hale, LLP

(57) ABSTRACT

A drawer slide assembly with an outer slide member with an elongate planar web including a parallel offset portion, having upper and lower bearing raceways along the length of the web, an intermediate slide member with a elongate planar web, having inner and outer upper and lower bearing raceways along the length of the web, and an inner slide member having an elongate planar web with upper and lower bearing raceways along the length of the web, with bearings disposed between and in rolling engagement with the respective outer and intermediate slide members, and intermediate and inner slide members.

34 Claims, 9 Drawing Sheets

U.S. PATENT DOCUMENTS

| | | |
|---|---|---|
| 3,451,730 A | 6/1969 | Krispinsky et al |
| 3,588,198 A | 6/1971 | Stewart et al. |
| 3,912,341 A | 10/1975 | Stein |
| 4,181,383 A | 1/1980 | Naef |
| 4,200,342 A | 4/1980 | Fall |
| 4,752,142 A | 6/1988 | Jackson et al. |
| 4,944,605 A | 7/1990 | Shen |
| 5,472,272 A | 12/1995 | Hoffman |
| 5,474,408 A * | 12/1995 | Dinitz et al. .................... 411/5 |
| 5,833,337 A * | 11/1998 | Kofstad ............... 312/334.8 X |
| 5,851,059 A * | 12/1998 | Cirocco ................. 312/334.11 |
| 5,871,265 A * | 2/1999 | Stewart et al. ........... 312/334.8 |
| 5,895,101 A | 4/1999 | Cabrales et al. |
| 6,209,979 B1 | 4/2001 | Fall et al. |
| 6,254,209 B1 * | 7/2001 | Parvin ................... 312/334.44 |
| 6,431,668 B1 * | 8/2002 | Reddicliffe .......... 312/334.1 X |

* cited by examiner

THREE MEMBER THIN DRAWER SLIDE

CROSS-REFERENCE TO RELATED APPLICATIONS

This application claims the benefit of U.S. Provisional Application No. 60/329,057, filed Oct. 12, 2001, entitled Three Member Thin Drawer Slide, which is hereby incorporated by reference as if set forth in full herein.

BACKGROUND OF THE INVENTION

The present invention relates generally to drawer slides, and more particularly to telescopic drawer slides.

Drawer slides are often used to extendably couple drawers, trays, and rack-mounted equipment to cabinets, racks and the like. The drawer slides do so by having one elongate member coupled to the cabinet or rack, and another elongate member attached to the drawer or equipment. The elongate members are slidably coupled so as to be able to longitudinally extend with respect to one another. This extension allows easy access to the drawer or equipment.

One type of drawer slide is a telescopic drawer slide. A telescopic drawer slide generally has an outer somewhat C-shaped member. An inner member, also generally C-shaped, is generally largely nested within the outer member. At times, an intermediate member is placed between the outer member and the inner member. The inclusion of the intermediate member allows for increased extension of the drawer or equipment.

In some applications, ball bearings connect the slide members. The ball bearings are placed in raceways formed along the longitudinal edges of the slide members, and the bearings slidably, or rollably, connect the slide members. The use of ball bearings allows for a smooth and generally consistent action.

In many applications, particularly rack-mounted applications, the width of the drawer slide is of some importance. The use of drawer slides having a very thin width reduces the space taken up by the drawer slide, and allows equipment to be placed closer together, thereby allowing for more equipment to be mounted in a particular rack.

Decreasing the width of the drawer slide, however, does create some problems. At times, the weight of the equipment can be substantial, and the drawer slide must be able to support substantial loads. This is particularly so when the drawer slide is extended, with the weight substantially distant from the rack. Moreover, failure of the drawer slide to support the load is generally unacceptable. This is due, for example, to the gross disparity between the value of the rack-mounted equipment and the drawer slide. This is also important, for example, for various safety reasons.

BRIEF SUMMARY OF THE INVENTION

The present invention provides a thin telescopic drawer slide.

These and other aspects of the present invention will be more readily understood with reference to the following figures and the accompanying detailed description.

DETAILED DESCRIPTION

Figure 1:
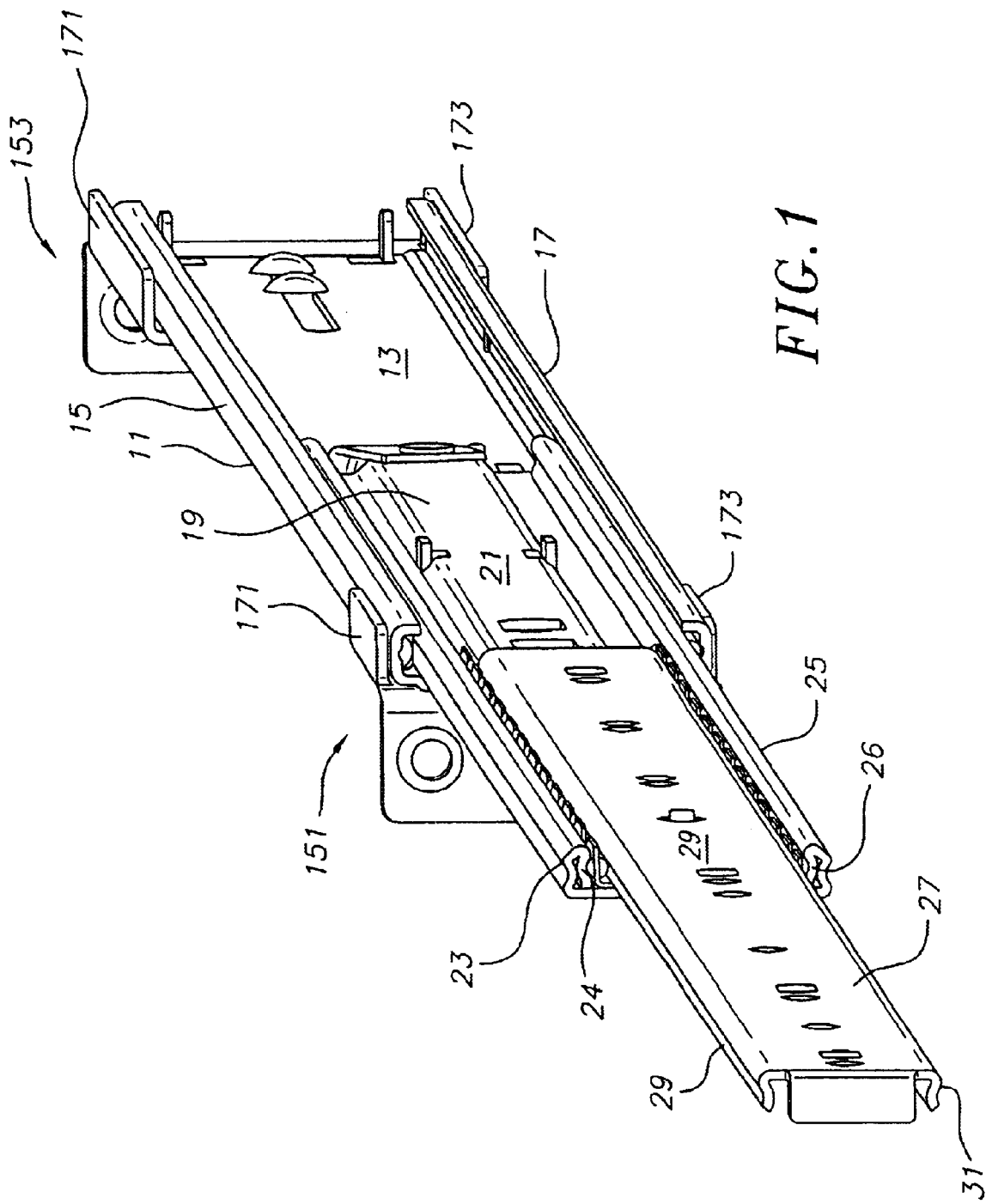
FIG. 1 is an isometric view of a telescopic drawer slide in accordance with the aspects of the present invention.

FIG. 1 illustrates a telescopic drawer slide in accordance with the aspects of the present invention. The drawer slide includes an outer member 11. The outer member has a substantially elongate web 13, an upper bearing raceway 15, and a lower bearing raceway 17 along upper and lower margins of the elongate web. The terms "upper", "lower", and other directional terms are used for convenience of description, in accordance with the usual mounting of the slide to a cabinet or the like.

Nestled within the outer slide member is an intermediate slide member 19. The intermediate slide member has a longitudinal elongate web 21. The intermediate slide member has an upper outer bearing raceway 23, an upper inner bearing raceway 24, a lower outer bearing raceway 25, and a lower inner bearing raceway 26, also along the upper and lower longitudinal margins of the elongate web. Nestled within the bearing raceways of the intermediate slide member is an inner slide member 27. The inner slide member has an elongate web 29 also with upper and lower bearing raceways 29, 31, respectively, along the margins of the elongate web. The slide members are longitudinally extendable with respect to one another.

The slide of FIG. 1 also includes latching features 16. These features are discussed in more detail, for example, in U.S. Provisional Application No. 60/249,137, entitled Friction Slide, filed Nov. 16, 2000, the disclosure of which is incorporated by reference.

Figure 2:
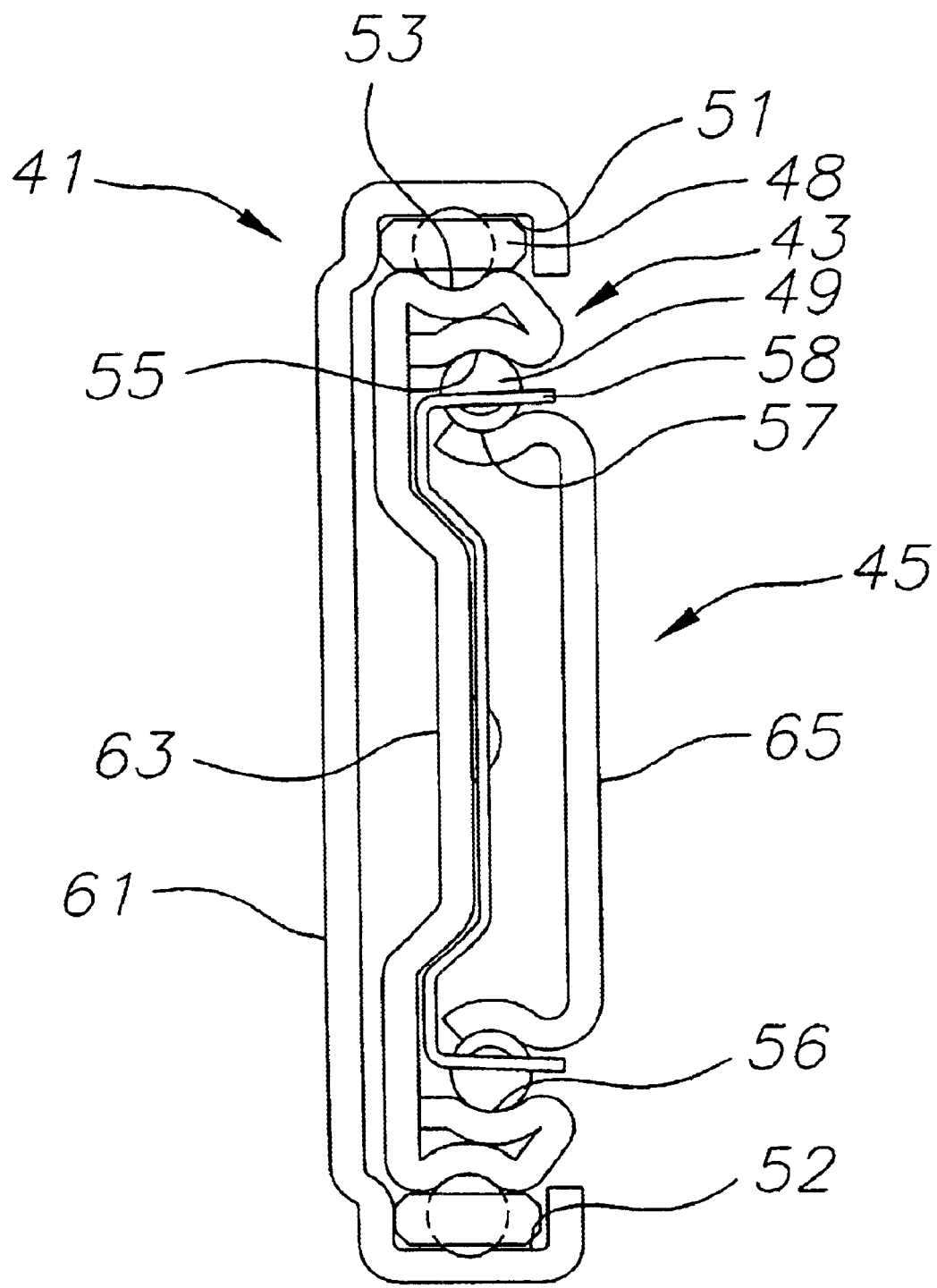
FIG. 2 is a cross-section view of a telescopic drawer slide in accordance with the present invention.

FIG. 2 illustrates a cross-section of the drawer slide of FIG. 1. The drawer slide includes an outer slide member 41, an intermediate slide member 43, and an inner slide member 45. Each of the slide members has a respective vertical web 61, 63, 65 with bearing raceways formed in the upper and lower margins of the vertical web. The intermediate slide member is largely nestled within bearing raceways 51, 52 of the outer slide member, and the inner slide member is largely nestled within bearing raceways 55, 56 of the intermediate slide member.

Figure 3:
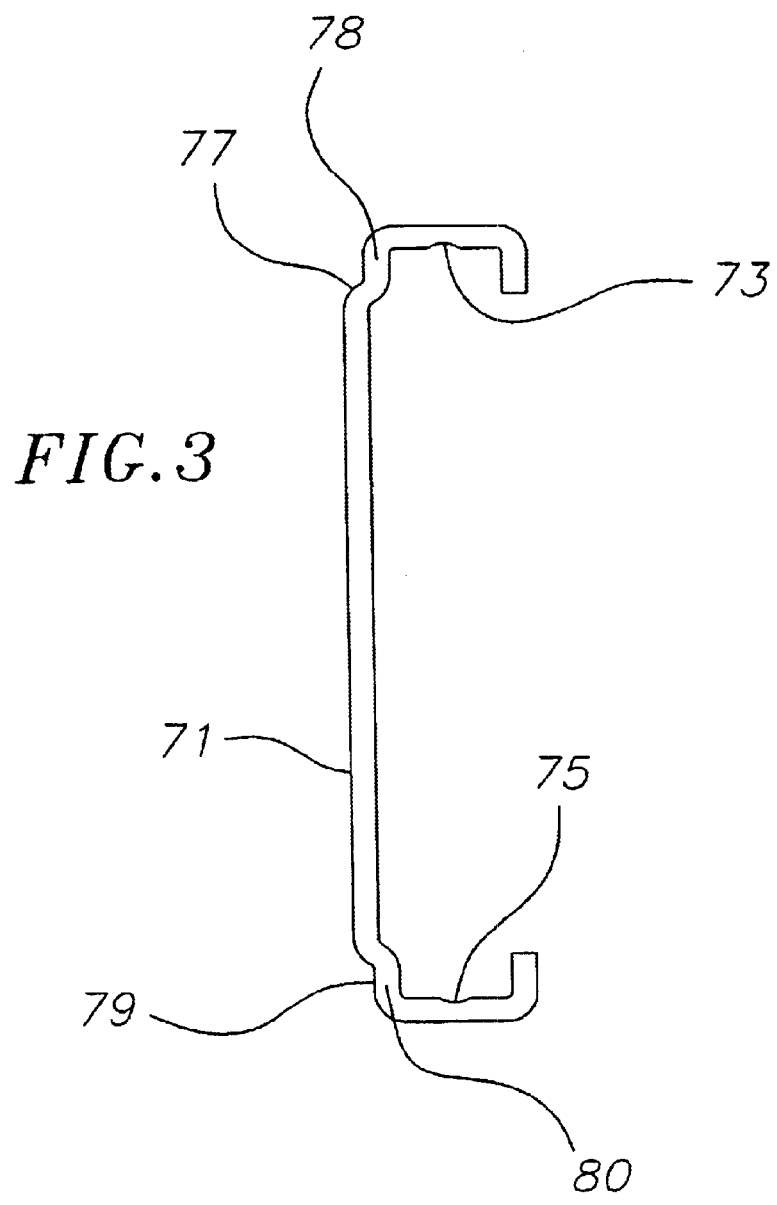
FIG. 3 is a cross-section of an outer slide member in accordance with aspects of the present invention.

As can be seen in FIG. 2, bearings 47 are disposed between the upper raceways 51 of the outer slide member and upward facing upper raceways 53 of the intermediate slide member, and bearings 49 are also placed between downward facing upper raceways 55 of the intermediate slide member and upper raceways 57 of the inner slide member. Similarly, the bearings are disposed between raceways of the frame of the lower bearing raceways of the outer slide member and the intermediate slide member, as well as the intermediate slide member and the inner slide member. The bearings slidably couple the slide members. Bearings may be disposed directly in the raceways, or may be disposed within a bearing spacer 48 or retainer 58 within the raceway, which serve to retain and properly space the bearings. In operation, the bearings also serve to transfer loads from the inner slide member to the intermediate slide member, and then to the outer slide member. A cross-section of the outer slide member is illustrated in FIG. 3. The outer slide member has a vertical web 71, with an upper bearing raceway 73 along the upper margin of the vertical web, and a lower bearing raceway 75 along the lower margin of the vertical web. In one embodiment, joggled offsets 77, 79 connect the vertical web to the bearing raceways. The offsets are in the same general direction in which the bearing raceways extend from the vertical web, and connect the central portion of the vertical web 71, to respective end portions 78, 80. The end portions 78, 80 are substantially parallel to the central portion of the vertical web 71. The offsets minimize bowing or warping of the slide member when subjected to vertical, horizontal, and/or torsional loads. In addition, the offsets provide an additional horizontal offset to the bearing raceways, which provides additional space for mounting hardware or other items between the webs of the outer and intermediate slide members. The additional space is useful, for example, in thin embodiments of the invention, and may be varied to accommodate clearance of specific hardware, such as particular size screws, rivets, stand-offs, pem-nuts, bayonets or other hardware known to those skilled in the art. In one such thin embodiment, a drawer slide with an envelope of 0.375 inch wide by 1.62 high was formed.

Figure 4:
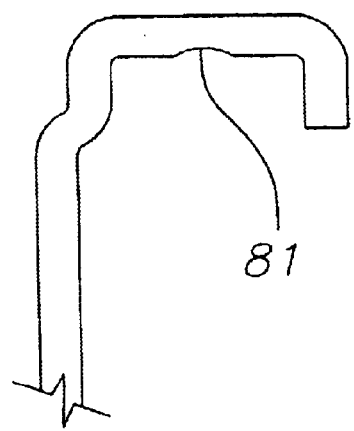
FIG. 4 is a cross-section of a bearing raceway of the outer slide member of FIG. 3.

FIG. 4 further illustrates the joggled offset of the outer slide, and also illustrates a gusset 81 in the bearing raceway. The linear gusset runs substantially along the length of the bearing raceway. As illustrated, the gusset is substantially along a center line of the bearing raceway. The linear gusset serves to constrain movement, particularly lateral movement, of bearings placed in the raceway. In one embodiment the gusset is formed by pressing on the surface of the bearing raceway. This pressing action serves to provide a cold reduced work hardened surface for contacting the ball bearings, and this surface limits the Brunelling effects.

In one embodiment the linear gusset allows for a 65 degree contact angle for a ball bearing placed in the raceway. In addition, the radius of the linear gusset provides clearance to allow for point contact of, in one embodiment, a three millimeter size ball bearing.

In one embodiment, integral stops are formed into the upper and lower bearing raceways. The stops provide contact with and contain the bearings or bearing spacers, while maintaining the material integrity of the outer member channel, and providing maximum shear strength for the formed stops. Such stops may be placed as desired to limit longitudinal movement.

Figure 5:
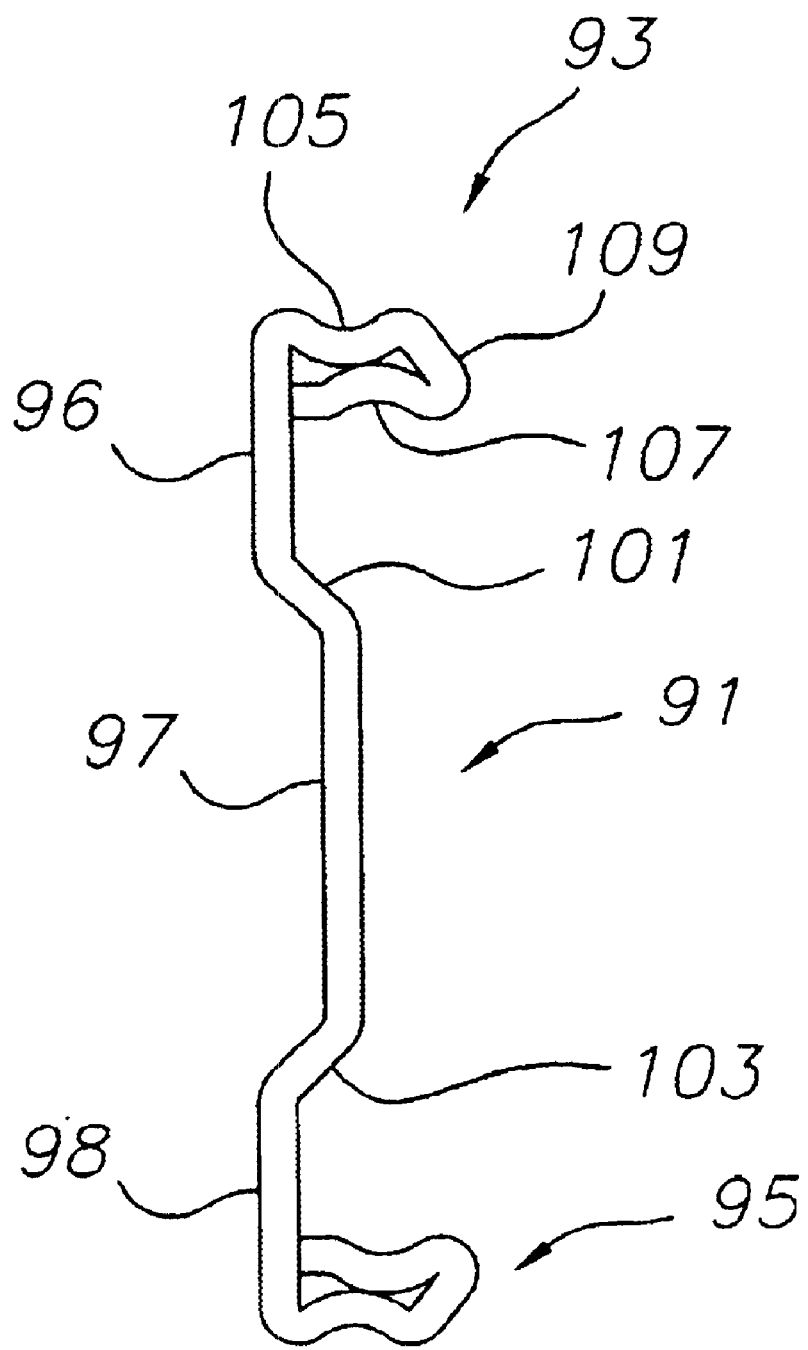
FIG. 5 is a cross-section of an intermediate drawer slide member from the present invention.

FIG. 5 illustrates a cross-section of the intermediate slide member. The intermediate slide member includes a substantially vertical web 91 with bearing raceways 93, 95 along the upper and lower margins of the vertical web. The vertical web includes a central portion 97, inset from the upper portion 96 and lower portion 98 by two jogs 101, 103 in the vertical web. The inset central portion allows for increased distance between the vertical web of the intermediate slide member and the vertical web of the outer slide member, as may be seen in FIG. 2. In one embodiment, the central portion of the vertical web is offset sufficiently to provide clearance for a #8 screw. It will be appreciated that the design of the offset distance may be varied to accommodate specific mounting hardware. The inset also provides increased rigidity of the slide member to minimize torsional twisting and bow along the length of the slide member.

In one embodiment, the ball races are formed by bending a portion of a slide member to form a largely doubled-over section approximately at right angles to the vertical web. The doubled-over section forms, using the upper bearing raceways as an example, an intermediate to outer member bearing raceway 105 and an intermediate to inner member bearing raceway 107. The two raceways are offset vertically. The vertical offset allows the material forming the raceways to provide substantially constant material thickness along the bearing raceways. The constant material thickness allows for maintenance of slide member material integrity and improved load bearing capacity. Connecting the two raceways is an angled transition 109 providing for increased rigidity of the member along the ball races.

Figure 6:
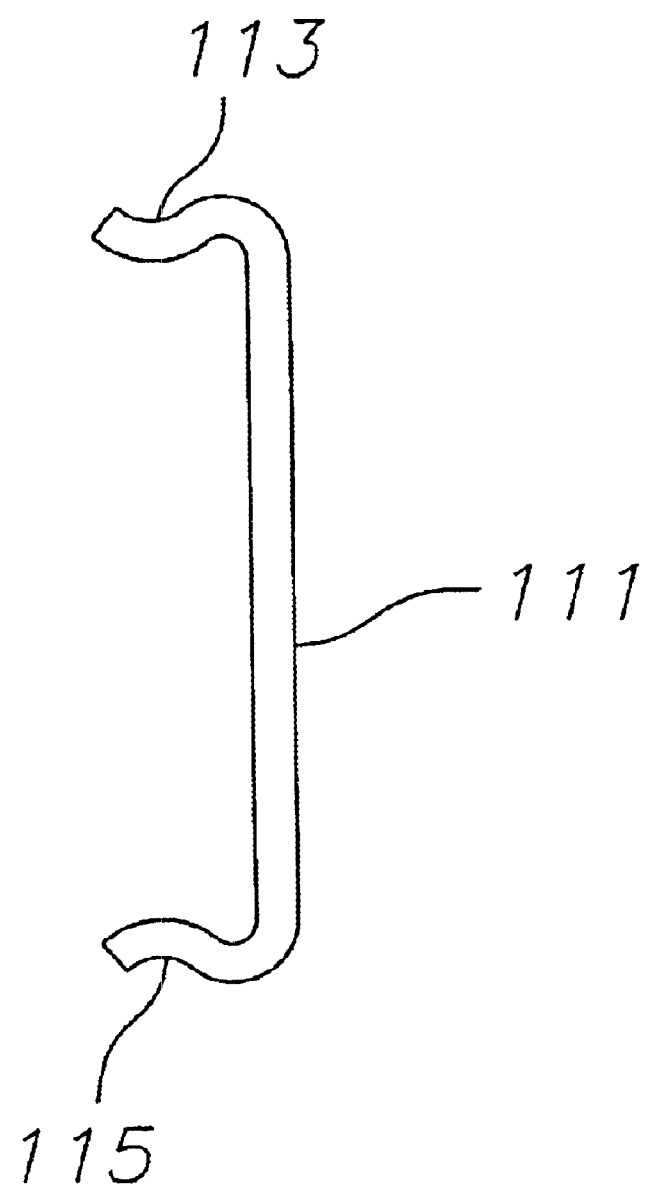
FIG. 6 is a cross-section of an inner slide member in accordance with the aspects of the present invention.

A cross-section of the inner slider member is illustrated in FIG. 6. The inner slide member has a vertical web 111 with upper and lower ball bearing raceways 113, 115 along the upper and lower margins, respectively, of the vertical web. The raceways are offset from the web a sufficient distance to provide clearance for mounting hardware used to mount the inner slide member to a drawer or equipment. The width of the vertical web is also sufficient to allow for lancing, forming tabs, and the like for use in mounting.

Figure 7:
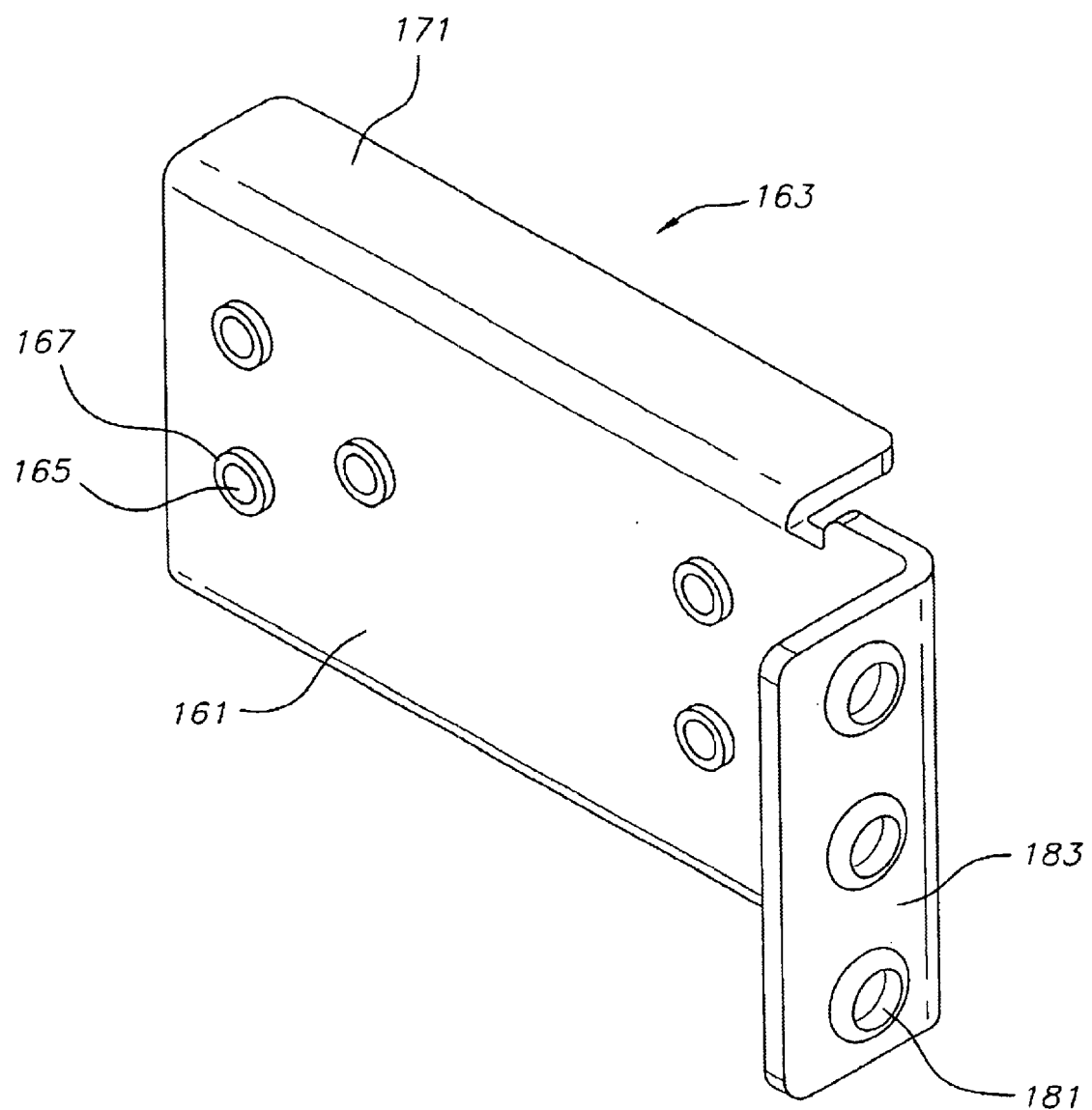
FIG. 7 is an isometric view of a mounting bracket in accordance with aspects of the present invention.

Returning to the slide of FIG. 1, it may be seen that mounting brackets are coupled to the slide. More specifically, in FIG. 1 a front mounting bracket 151 is coupled approximate a front edge of the outer slide member, and a rear mounting bracket 153 is coupled approximate a rear edge of the slide member. As illustrated in FIG. 7, the mounting bracket includes a face plate 161. The face plate is adapted to be placed with one side 163 against the outer slide member. Mounting holes 165 extend through the face plate to allow mounting screws, hardware and the like to secure the face plate, and thereby the mounting bracket, to the outer slide member.

As illustrated in FIG. 7, the mounting holes are arranged in triangular patterns approximate the forward and rearward edges of the face plate. The placement of the holes in such a pattern allows the mounting bracket to be more easily used with slides of varying profiles, particularly varying heights. In one embodiment, the holes are extruded, with an extrusion 167 extending outwards from face plate away from the side of the face plate mounted to the outer slide member. The extrusions, in one embodiment, are threaded, thereby allowing for increased ease of use, and perhaps more importantly decreased hardware requirements, for mounting the face plate to the outer slide member.

The mounting bracket also include wrapping flanges 171, 173 (seen also in FIG. 1) extending along the top and bottom edges of the face plate. The wrapping flanges extend in the direction of the slide. The wrapping flanges are adapted to hug or receive the outer slide member, as may be seen in FIG. 1. The wrapping flanges thereby provide increased support to the slide member to which the mounting bracket is mated, in this example the outer slide member.

Returning to FIG. 7, the mounting bracket also includes a front flange 181. The front flange extends from what for convenience will be termed the front of the face plate. As will be evident, if not so already, the mounting bracket may be mounted to the slide with either the front of the face plate in the direction of the front of the slide or the rear of the slide. The front flange extends in the direction away from the slide, when the mounting bracket is mounted to the slide.

Three holes 183 are placed in the front flange. The holes are placed in a line, and are suitable for receiving bolts, pins, and other hardware for attaching the mounting brackets to face frames, vertical beams, racks, and similar structures. As may be seen in FIG. 1, the front flange extends away from the slide, and is largely perpendicular to both the direction of extension of the slide and a plane formed by the vertical webs.

Figure 8:
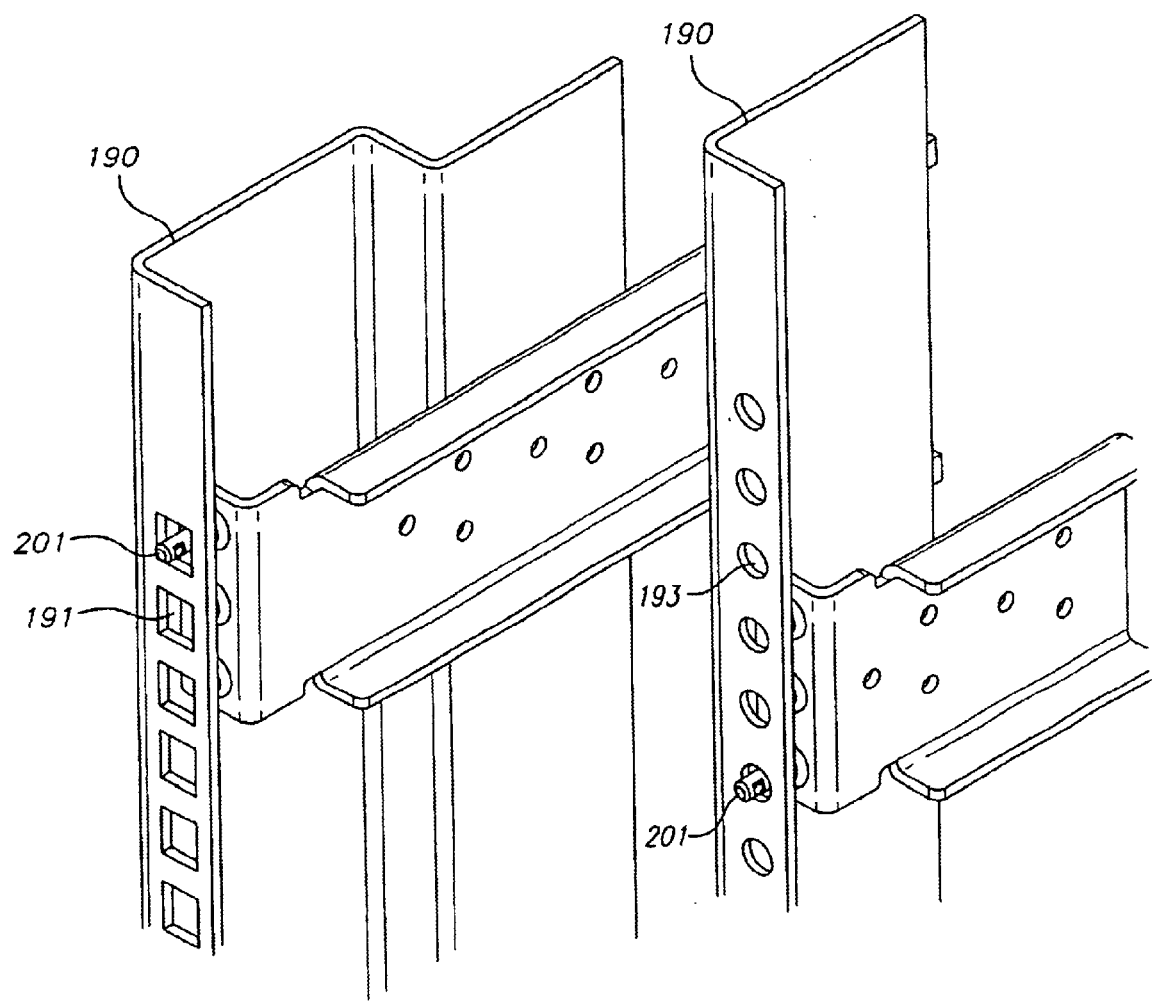
FIG. 8 is an isometric view of the mounting bracket of FIG. 7 and a strut of a mounting rack.

The holes in the front flange, in one embodiment, are embossed, protruding towards the front surface of the front flange (with "front" as considered with respect to the discussion of the front flange). The holes therefore allow for more easier seating of, for example, pins placed from the rear of the front flange through to the front surface of the front flange. Moreover, for racks 190 with square holes 191, or sufficiently large round holes 193, as may be seen in FIG. 8, the extending protrusions on the front of the front flange allow more readily for seating of the flange in position on the rack during installation.

Figure 9:
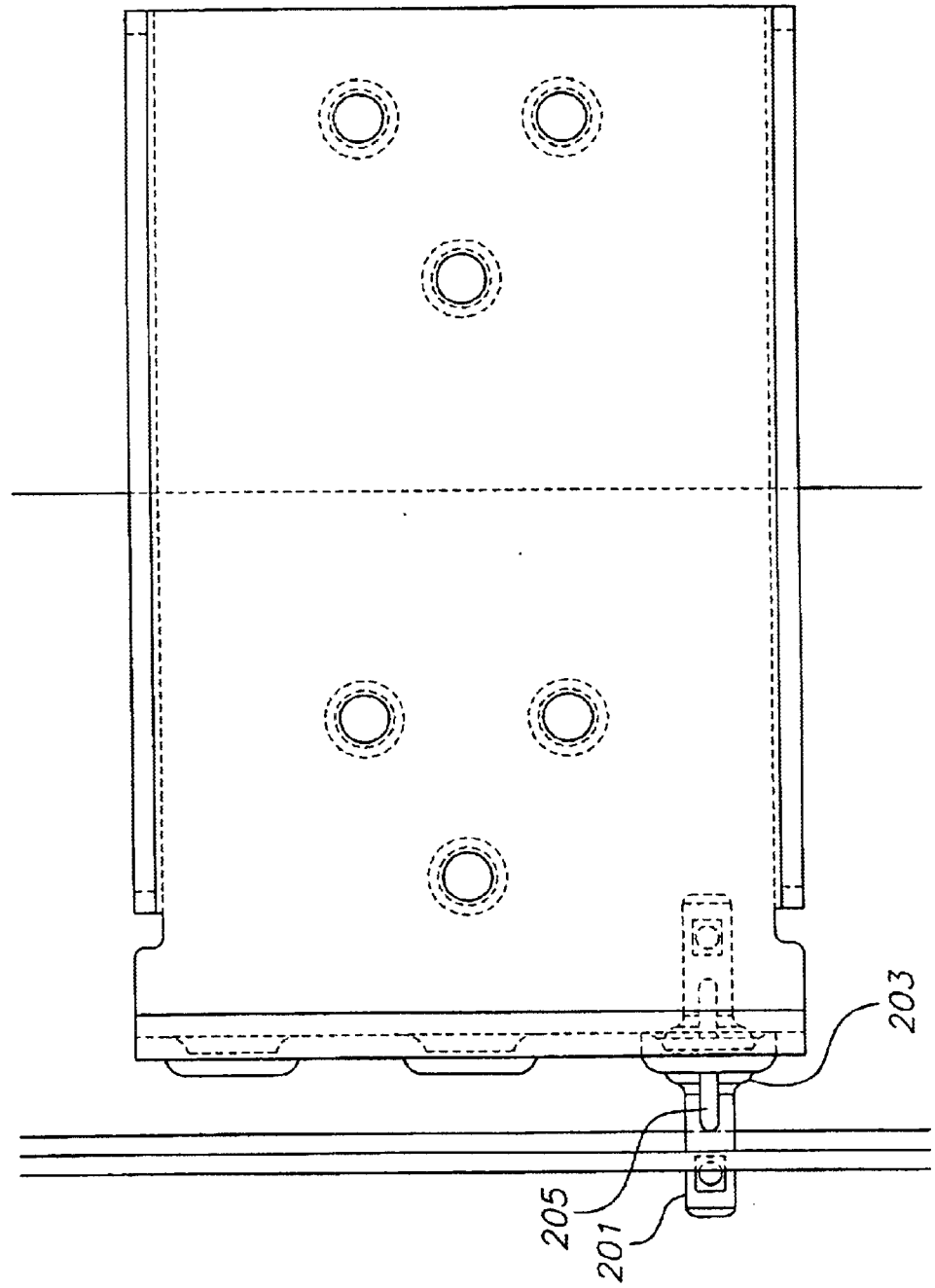
FIG. 9 is a side view of the mounting bracket of FIG. 7 and a strut of a mounting rack.
Figure 10:
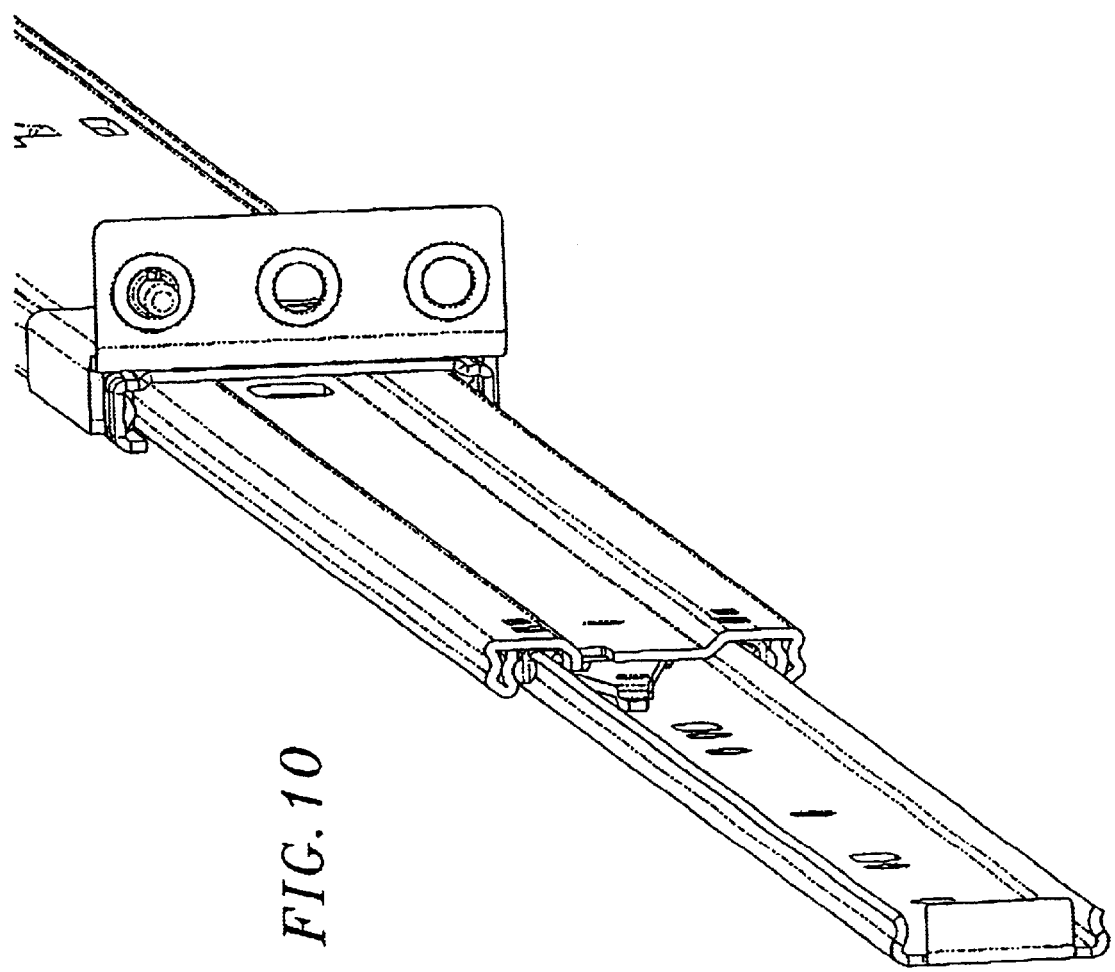
FIG. 10 is an isometric view of the mounting bracket of FIG. 7 attached to a drawer slide.

In one embodiment disposable pins 201 are also provided to increase ease of installation. As may be seen in FIGS. 8 and 9, the pins are substantially cylindrical with a bulge 203 about the middle of the pin. The bulge is sized with respect to the holes in the front flange to provide a tight fit, allowing for the pins to be snapped into the holes. The diameter of the forward edge of the pin is sized relative to the holes, or cutouts, in the racks such that the pins may be placed in the cutouts, thereby supporting the mounting bracket, and slide, during installation. After installation is complete and mounting hardware is positioned and secure, the pins may be removed and disposed.

In one embodiment, the pins include a slot 205 about the middle of the pin. The slot creates a weakened area in the pin about the front flange. This weakened area, when additional force is provided to lever the pin about the front flange, is designed in one embodiment to break and free the pin from the flange when no longer needed. In another embodiment, force is applied to the front of the pin, releasing the pin from engagement with the front flange when the pin is no longer needed.

The present invention therefore provides a thin drawer slide, and accompanying useful related items. Although the invention has been described with respect to certain embodiments, it should be realized that the invention may be practiced other than as specifically described. Accordingly, the invention should be viewed as the claims supported by this specification and their equivalents.

What is claimed is:

1. A drawer slide assembly comprising:
an outer slide member, comprising
   a central vertical web portion;
   an upper vertical portion, substantially parallel to and offset from the central vertical web portion;
   an upper arm extending generally horizontally from the upper vertical portion, having a generally flat longitudinal bearing raceway for receiving bearings therein;
   a lip extending generally downward vertically from the upper arm;
   a lower vertical portion, substantially parallel to and offset from the central vertical web portion, wherein the upper and lower vertical portions are substantially aligned;
   a lower arm extending generally horizontally from the lower vertical portion having a generally flat longitudinal bearing raceway for receiving bearings therein;
   a lip extending generally upward vertically from the lower arm;
an intermediate slide member, comprising
   a central vertical web portion;
   an upper vertical portion, substantially parallel to and offset from the central vertical web portion;
   an upper arm extending generally horizontally away from the upper vertical portion to form a first upper bearing raceway, the arm further extending at an angle from the raceway, then extending generally horizontally toward the upper vertical portion to form a second upper bearing raceway;
   a lower vertical portion, substantially parallel to and offset from the central vertical web portion, wherein the upper and lower vertical portions are substantially aligned;
   a lower arm extending generally horizontally away from the lower vertical portion to form a first lower bearing raceway, the arm further extending at an angle from the raceway, then extending generally horizontally toward the lower vertical portion to form a second lower bearing raceway;
an inner slide member, comprising
   a vertical web portion;
   an upper arm extending generally horizontally from the vertical web;
   a lower arm extending generally horizontally from the vertical web; and
   a plurality of ball bearings disposed within and in rolling engagement with the bearing raceways, wherein each bearing raceway of the outer slide member includes a linear gusset to receive the ball bearings.

2. The drawer slide assembly of claim 1, wherein the gusset is pressed into the raceway.

3. The drawer slide assembly of claim 1, wherein the gusset is work hardened.

4. The drawer slide assembly of claim 1, wherein the gusset is cold reduced work hardened.

5. The drawer slide assembly of claim 1, wherein the gusset provides a bearing contact angle of 65 degrees.

6. The drawer slide assembly of claim 1, wherein the bearing size is nominally at least 3 millimeters.

7. The drawer slide assembly of claim 1, further comprising a mounting bracket.

8. The drawer slide assembly of claim 7, wherein the mounting bracket includes a face plate adapted to engage the outer slide.

9. The drawer slide assembly of claim 7, wherein the mounting bracket includes mounting holes arranged in a triangular pattern.

10. The drawer slide assembly of claim 9, wherein the mounting holes are extruded through the mounting bracket.

11. The drawer slide assembly of claim 9, wherein the mounting holes are threaded.

12. The drawer slide assembly of claim 7, wherein the mounting bracket includes a front flange, adapted for engaging a structure.

13. The drawer slide assembly of claim 1, wherein the nominal width of the drawer slide assembly is 0.375 inches.

14. A drawer slide assembly comprising:
an outer slide member having an elongate planar web, bounded by and substantially perpendicular to an upper bearing raceway and a lower bearing raceway that are each generally longitudinally flat along the length of the planar web, the profile of the planar web defining offset end portions bounding and substantially parallel to a central portion;

an intermediate slide member having an elongate planar web, bounded by and substantially perpendicular to upper inner and outer bearing raceways and lower inner and outer bearing raceways along the length of the planar web, the profile of the planar web defining end portions bounding a substantially parallel offset central portion;

an inner slide member having an elongate planar web bounded by an upper bearing raceway and a lower bearing raceway along the length of the planar web, a plurality of bearings disposed between and in rolling engagement with the respective outer and intermediate slide members, and intermediate and inner slide members, wherein the bearing raceways of the outer slide member each include an invention therein that receives the bearings and provides lateral stability to the bearings; and further comprising at least one mounting bracket attached to the outer slide member, wherein the at least one mounting bracket includes wrapping flanges which receive the outer slide member.

15. The drawer slide assembly of claim 14, wherein the bearing raceways of the outer slide member include formed stops.

16. The drawer slide assembly of claim 14, wherein the respective upper and lower inner and outer bearing raceways of the intermediate slide member are formed by a doubled-over portion of the intermediate slide member.

17. The drawer slide assembly of claim 16, further comprising an angled transition section connecting the inner and outer raceways.

18. The drawer slide assembly of claim 14, wherein the mounting bracket includes a face plate adapted to be attached to the outer slide.

19. The drawer slide assembly of claim 18, wherein the face plate includes mounting holes arranged in a triangle pattern.

20. The drawer slide assembly of claim 19, wherein the mounting holes are extruded.

21. The drawer slide assembly of claim 19, wherein the mounting holes are threaded.

22. The drawer slide assembly of claim 14, wherein the mounting bracket includes a front flange adapted to attach the bracket to another structure.

23. The drawer slide assembly of claim 14, further comprising at least one pin adapted to secure the mounting bracket to another structure.

24. The drawer slide assembly of claim 23, wherein the pin is disposable.

25. The drawer slide assembly of claim 23, wherein the pin is substantially cylindrical.

26. The drawer slide assembly of claim 25, wherein the pin includes a slot about its middle.

27. The drawer slide assembly of claim 14, wherein the invention is a bearing gusset.

28. The drawer slide assembly of claim 27, wherein the bearing gussets have a hardened surface.

29. The drawer slide assembly of claim 27, wherein the hardened surface of the bearing gusset is a cold reduced work hardened surface.

30. The drawer slide assembly of claim 27, wherein the gusset provides a 65 degree bearing contact angle.

31. A drawer slide assembly comprising:
an outer slide member having an elongate planar web, bounded by and substantially perpendicular to an upper bearing raceway and a lower bearing raceway that are each generally longitudinally flat along the length of the planar web, the profile of the planar web defining offset end portions bounding and substantially parallel to a central portion;

an intermediate slide member having an elongate planar web, bounded by and substantially perpendicular the upper inner and outer bearing raceways and lower inner and outer bearing raceways along the length of the planar web, the profile of the planar web defining end portions bounding a substantially parallel offset central portion;

an inner slide member having an elongate planar web bounded by an upper bearing raceway and a lower bearing raceway along the length of the planar web, and a plurality of bearings disposed between and in rolling engagement with the respective outer and intermediate slide members, and intermediate and inner slide members, wherein the bearing raceways of the outer slide member each include an invention therein that receives the bearings and provides lateral stability to the bearings;

further comprising at least one mounting bracket attached to the outer slide member;

further comprising at least one pin adapted to secure the mounting bracket to another structure;

wherein the pin is substantially cylindrical; and wherein the pin includes an enlarged section about its middle.

32. A drawer slide assembly comprising:
an outer slide member, comprising
a central vertical web portion;
an upper vertical portion, substantially parallel to and offset from the central vertical web portion;
an upper arm extending generally horizontally from the upper vertical portion, having a generally flat longitudinal bearing raceway for receiving bearings therein;
a lip extending generally downward vertically from the upper arm;
a lower vertical portion, substantially parallel to and offset from the central vertical web portion, wherein the upper and lower vertical portions are substantially aligned;
a lower arm extending generally horizontally from the lower vertical portion having a generally flat longitudinal bearing raceway for receiving bearings therein;
a lip extending generally upward vertically from the lower arm;

an intermediate slide member, comprising
a central vertical web portion;
an upper vertical portion, substantially parallel to and offset from the central vertical web portion;
an upper arm extending generally horizontally away from the upper vertical portion to form a first upper bearing raceway, the arm further extending at an angle from the raceway, then extending generally horizontally toward the upper vertical portion to form a second upper bearing raceway;
a lower vertical portion, substantially parallel to and offset from the central vertical web portion, wherein the upper and lower vertical portions are substantially aligned;
a lower arm extending generally horizontally away from the lower vertical portion to form a first lower bearing raceway, the arm further extending at an angle from the raceway, then extending generally horizontally toward the lower vertical portion to form a second lower bearing raceway;

an inner slide member, comprising
- a vertical web portion;
- an upper arm extending generally horizontally from the vertical web;
- a lower arm extending generally horizontally from the vertical web;

a plurality of bearings disposed within and in rolling engagement with the bearing raceways; and a mounting bracket that includes a front flange, adapted for engaging a structure, wherein the front flange includes embossed mounting holes.

33. A drawer slide assembly comprising:

an outer slide member, comprising
- a central vertical web portion;
- an upper vertical portion, substantially parallel to and offset from the central vertical web portion;
- an upper arm extending generally horizontally from the upper vertical portion, having a generally flat longitudinal bearing raceway for receiving bearings therein;
- a lip extending generally downward vertically from the upper arm;
- a lower vertical portion, substantially parallel to and offset from the central vertical web portion, wherein the upper and lower vertical portions are substantially aligned;
- a lower arm extending generally horizontally from the lower vertical portion having a generally flat longitudinal bearing raceway for receiving bearings therein;
- a lip extending generally upward vertically from the lower arm;

an intermediate slide member, comprising
- a central vertical web portion;
- an upper vertical portion, substantially parallel to and offset from the central vertical web portion;
- an upper arm extending generally horizontally away from the upper vertical portion to form a first upper bearing raceway, the arm further extending at an angle from the raceway, then extending generally horizontally toward the upper vertical portion to form a second upper bearing raceway;
- a lower vertical portion, substantially parallel to and offset from the central vertical web portion, wherein the upper and lower vertical portions are substantially aligned;
- a lower arm extending generally horizontally away from the lower vertical portion to form a first lower bearing raceway, the arm further extending at an angle from the raceway, then extending generally horizontally toward the lower vertical portion to form a second lower bearing raceway;

an inner slide member, comprising
- a vertical web portion;
- an upper arm extending generally horizontally from the vertical web;
- a lower arm extending generally horizontally from the vertical web;

a plurality of bearings disposed within and in rolling engagement with the bearing raceways; and a mounting bracket that includes a front flange, adapted for engaging a structure and wherein the mounting bracket includes wrapping flanges, adapted to receive the outer slide.

34. A drawer slide assembly comprising:

an outer slide member, comprising
- a central vertical web portion;
- an upper vertical portion, substantially parallel to and offset from the central vertical web portion;
- an upper arm extending generally horizontally from the upper vertical portion, having a generally flat longitudinal bearing raceway for receiving bearings therein;
- a lip extending generally downward vertically from the upper arm;
- a lower vertical portion, substantially parallel to and offset from the central vertical web portion, wherein the upper and lower vertical portions are substantially aligned;
- a lower arm extending generally horizontally from the lower vertical portion having a generally flat longitudinal bearing raceway for receiving bearings therein;
- a lip extending generally upward vertically from the lower arm;

an intermediate slide member, comprising
- a central vertical web portion;
- an upper vertical portion, substantially parallel to and offset from the central vertical web portion;
- an upper arm extending generally horizontally away from the upper vertical portion to form a first upper bearing raceway, the arm further extending at an angle from the raceway, then extending generally horizontally toward the upper vertical portion to form a second upper bearing raceway;
- a lower vertical portion, substantially parallel to and offset from the central vertical web portion, wherein the upper and lower vertical portions are substantially aligned;
- a lower arm extending generally horizontally away from the lower vertical portion to form a first lower bearing raceway, the arm further extending at an angle from the raceway, then extending generally horizontally toward the lower vertical portion to form a second lower bearing raceway;

an inner slide member, comprising
- a vertical web portion;
- an upper arm extending generally horizontally from the vertical web;
- a lower arm extending generally horizontally from the vertical web;

a plurality of bearings disposed within and in rolling engagement with the bearing raceways;

a mounting bracket that includes a front flange, adapted for engaging a structure; and a pin adopted to couple the front flange to a structure.

* * * * *

UNITED STATES PATENT AND TRADEMARK OFFICE
CERTIFICATE OF CORRECTION

PATENT NO. : 6,854,816 B2
APPLICATION NO. : 10/272617
DATED : February 15, 2005
INVENTOR(S) : Charles A. Milligan It is certified that error appears in the above-identified patent and that said Letters Patent is hereby corrected as shown below:

On the Title Page
(57) ABSTRACT, line 4     Delete "with a",
Insert --with an--

In the Specification
Column 4, line 46     After "from",
Insert --the--

Column 4, line 52     Delete "include",
Insert --includes--

In the Claims
Column 7, line 15, Claim 14     Delete "invention",
Insert --indention--

Column 7, line 55, Claim 27     Delete "invention",
Insert --indention--

Column 8, line 5, Claim 31     After "perpendicular",
Insert --to--

Column 8, line 18, Claim 31     Delete "invention",
Insert --indention--

Signed and Sealed this

Seventeenth Day of November, 2009

David J. Kappos
*Director of the United States Patent and Trademark Office*